US012198186B2

(12) United States Patent
Herdrich et al.

(10) Patent No.: US 12,198,186 B2
(45) Date of Patent: *Jan. 14, 2025

(54) SYSTEMS, APPARATUSES, AND METHODS FOR RESOURCE BANDWIDTH ENFORCEMENT

(71) Applicant: Intel Corporation, Santa Clara, CA (US)

(72) Inventors: Andrew Herdrich, Hillsboro, OR (US); Edwin Verplanke, Chandler, AZ (US); Ravishankar Iyer, Portland, OR (US); Christopher Gianos, Sterling, MA (US); Jeffrey D. Chamberlain, Tracy, CA (US); Ronak Singhal, Portland, OR (US); Julius Mandelblat, Haifa (IL); Bret Toll, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/401,575

(22) Filed: Aug. 13, 2021

(65) Prior Publication Data
US 2021/0374848 A1 Dec. 2, 2021

Related U.S. Application Data

(63) Continuation of application No. 14/671,496, filed on Mar. 27, 2015, now abandoned.

(51) Int. Cl.
*G06Q 40/03* (2023.01)
*G06F 12/0875* (2016.01)
*G06F 12/0897* (2016.01)

(52) U.S. Cl.
CPC .......... *G06Q 40/03* (2023.01); *G06F 12/0875* (2013.01); *G06F 12/0897* (2013.01); *G06F 2212/1016* (2013.01)

(58) Field of Classification Search
CPC .............. G06Q 40/025; G06F 12/0875; G06F 12/0897; G06F 2212/1016; G06F 2212/502
See application file for complete search history.

(56) References Cited

U.S. PATENT DOCUMENTS

| 5,966,546 | A | 10/1999 | Thomas et al. |
| 8,027,354 | B1 * | 9/2011 | Portolani ................ H04L 49/70 370/395.2 |
| 8,352,648 | B1 | 1/2013 | Puranik |
| 9,239,784 | B1 * | 1/2016 | Haghighi ............ G06F 12/0897 |

(Continued)

OTHER PUBLICATIONS

Non-Final Office Action, U.S. Appl. No. 14/671,496, Sep. 2, 2021, 24 pages.

*Primary Examiner* — Jorge A Chu Joy-Davila
(74) *Attorney, Agent, or Firm* — NICHOLSON DE VOS WEBSTER & ELLIOTT LLP

(57) ABSTRACT

Systems, methods, and apparatuses for resource bandwidth monitoring and control are described. For example, in some embodiments, an apparatus comprising a requestor device to send a credit based request, a receiver device to receive and consume the credit based request, and a delay element in a return path between the requestor and receiver devices, the delay element to delay a credit based response from the receiver to the requestor are detailed.

13 Claims, 17 Drawing Sheets

(56) References Cited

U.S. PATENT DOCUMENTS

| | | | |
|---|---|---|---|
| 9,559,973 B1* | 1/2017 | Aithal | H04L 47/2441 |
| 10,528,388 B1* | 1/2020 | Chang | G06F 9/4881 |
| 2002/0078268 A1* | 6/2002 | Lasserre | G06F 1/329 |
| | | | 709/212 |
| 2003/0105796 A1* | 6/2003 | Sandri | G06F 9/5011 |
| | | | 718/1 |
| 2004/0243600 A1* | 12/2004 | Ikeda | G06F 3/0605 |
| 2005/0240668 A1* | 10/2005 | Rolia | H04L 67/62 |
| | | | 709/226 |
| 2008/0082708 A1 | 4/2008 | Wong et al. | |
| 2010/0049942 A1 | 2/2010 | Kim et al. | |
| 2011/0087843 A1* | 4/2011 | Zhao | G06F 12/0864 |
| | | | 711/E12.001 |
| 2011/0202926 A1 | 8/2011 | Chambliss | |
| 2015/0007189 A1 | 1/2015 | De et al. | |

\* cited by examiner

| Bits | Field |
|---|---|
| 0–31 | RMID 305 |
| 32–63 | CLOS 303 |

(PER THREAD) MODEL SPECIFIC REGISTER (MSR) 301

FIG. 3

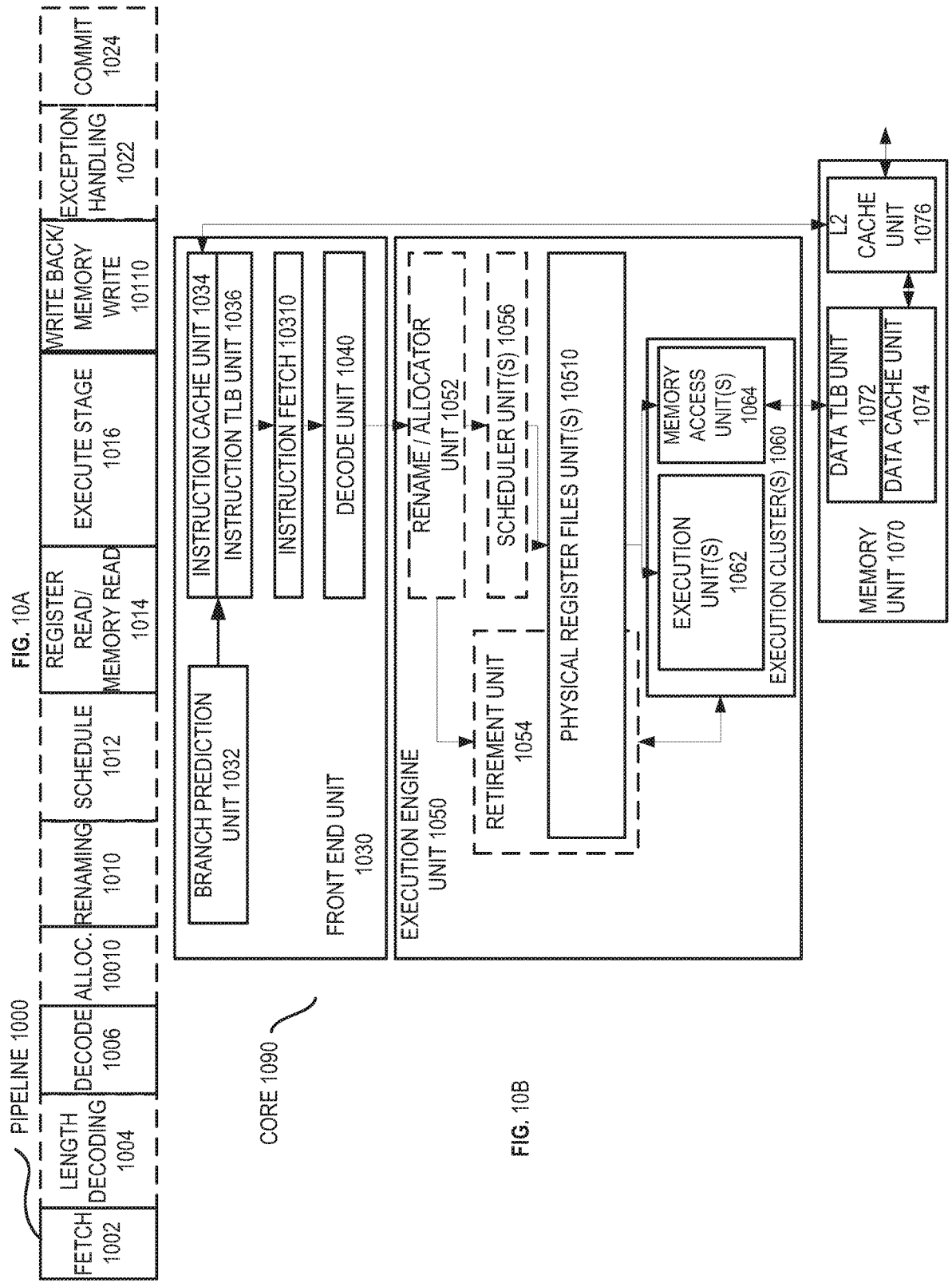

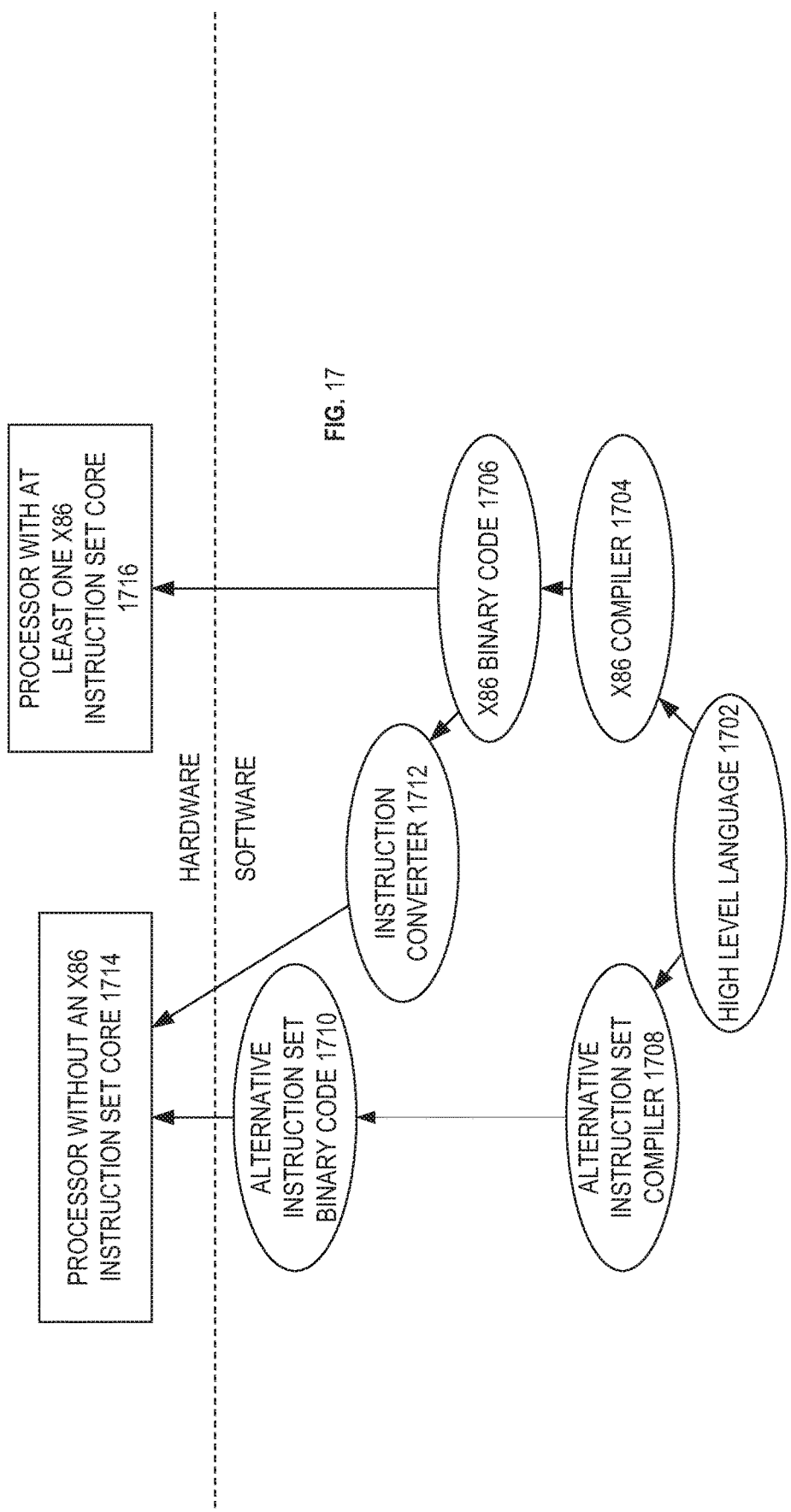

SYSTEMS, APPARATUSES, AND METHODS FOR RESOURCE BANDWIDTH ENFORCEMENT

FIELD OF INVENTION

The field of invention relates generally to computer processor and memory architecture, and, more specifically, to resource bandwidth.

BACKGROUND

The well-known datacenter "noisy neighbor" problem can cause substantial performance variation even for stable compute-bound workloads. In practical terms, running a workload in a cloud provider's environment on different days or at different times of day can lead to substantial performance variability depending on the load of the servers in question and the behavior of other virtual machines (VMs) running on other cores of the server systems. A large portion of this contention is due to shared platform resources such as last-level cache space and memory bandwidth.

This customer-visible performance variation leads to significant degradation in the overall perception of cloud service providers as a viable alternative to the traditional local server deployment approach, despite the advantages of the cloud (scalability, reliability, total cost of ownership, manageability, etc.).

One example of a noisy neighbor is a memory bandwidth intense application or VM. Such an application may stream through the cache and consume all of the memory bandwidth, disrupting the performance of other applications or VMs running on the same server.

BRIEF DESCRIPTION OF THE DRAWINGS

The present invention is illustrated by way of example and not limitation in the figures of the accompanying drawings, in which like references indicate similar elements and in which:

FIG. 3 illustrates an embodiment of a MSR.

FIG. 10A is a block diagram illustrating both an exemplary in-order pipeline and an exemplary register renaming, out-of-order issue/execution pipeline according to embodiments of the invention.

FIG. 10B is a block diagram illustrating both an exemplary embodiment of an in-order architecture core and an exemplary register renaming, out-of-order issue/execution architecture core to be included in a processor according to embodiments of the invention.

FIG. 17 is a block diagram contrasting the use of a software instruction converter to convert binary instructions in a source instruction set to binary instructions in a target instruction set according to embodiments of the invention.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While there are approaches to deal with cache contention, control over memory bandwidth contention is at times is still an issue. Discussed below are embodiments to limit an agent's (e.g., a processor core) request injection rate to receivers outside of the agent (such as shared resources like cache or Random Access Memory (RAM)) in order to limit the resource utilization of overly aggressive applications, particularly in the datacenter or communications applications. In practical terms, this at least allows for control over noisy neighbor applications or virtual machines (VMs) in a datacenter and in communications, etc.

Applications that over-utilize memory bandwidth may be controlled and throttled across a wide range of settings, enabling more precise control over the degree to which a noisy neighbor is allowed to interfere. This enables both throughput and fairness (runtime determinism) advantages when applied to real workloads.

Memory bandwidth control also offers benefits when combined with monitoring such as Cache Monitoring Technology (CMT) and Memory Bandwidth Monitoring (MBM) that enable more intelligent and fine-grained bandwidth limit decisions to be made based on application behavior.

Figure 1:
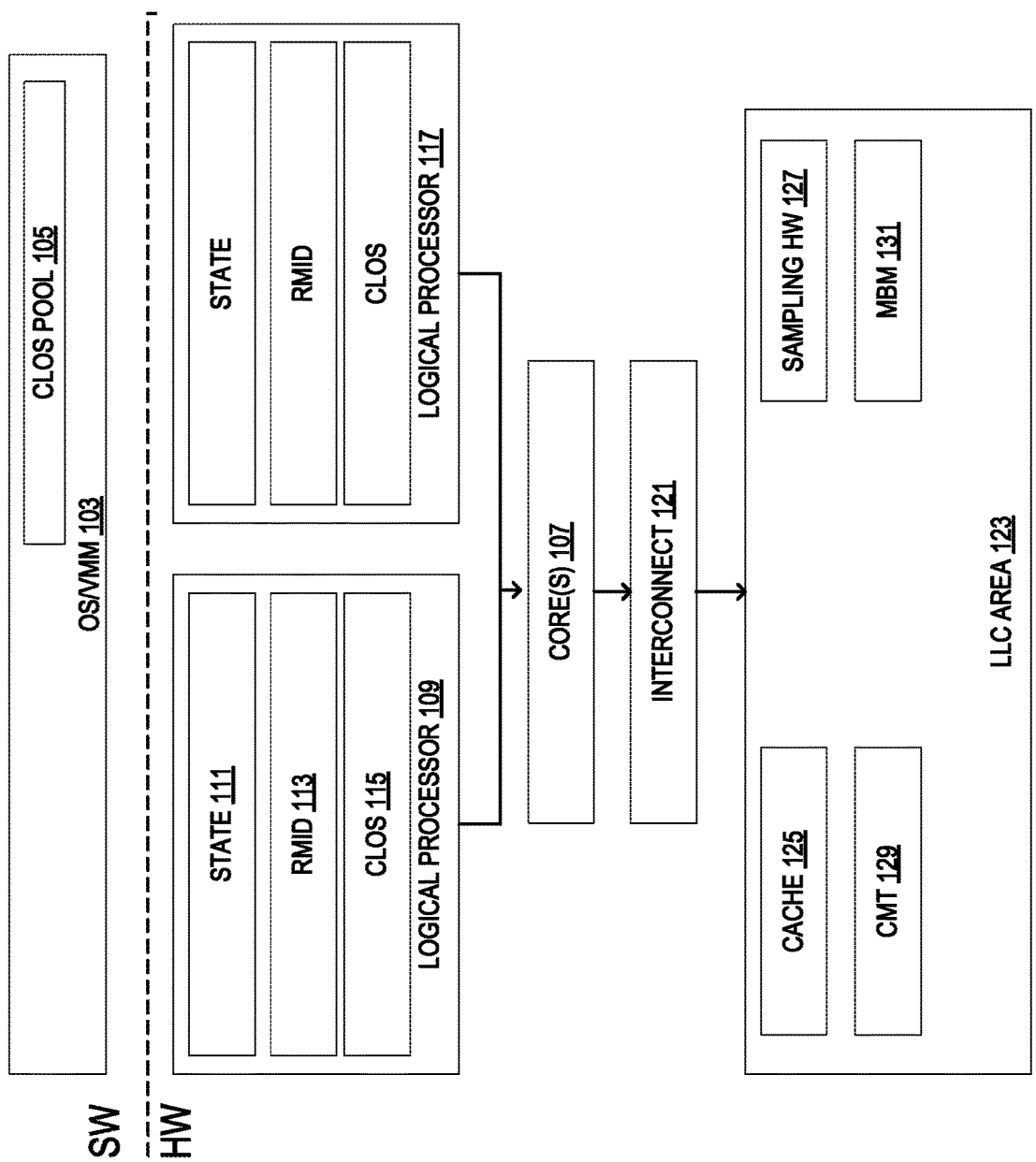
FIG. 1 illustrates an embodiment of a system to utilize memory bandwidth control.

FIG. 1 illustrates an embodiment of a system to utilize memory bandwidth control. In this illustration, there are several components including both software (an operating system (OS) or a virtual machine monitor (VMM) also called a hypervisor) stored in memory (such as random access memory RAM or static memory such as a disk) and hardware components.

In an embodiment, a mechanism for an OS or hypervisor to indicate a software-defined identification (ID) for one or more software threads (applications, virtual machines, etc.) scheduled to run on a logical processor is called a Resource Monitoring ID (RMID). Each logical processor (thread) in the system can be assigned an RMID independently, or multiple logical processors can be assigned to the same RMID value (e.g., to track an application with multiple threads). For each logical processor, only one RMID value is active at a time. In some embodiments, the number of RMIDs per processor is given by information stored in the processor itself.

In some embodiments, this is enforced through one or more model specific registers (MSRs) that specifies the active RMID of a logical processor. FIG. 3 illustrates an embodiment of these registers. In this example, a per logical processor (e.g., thread) MSR 301 includes fields for class of service (CLOS) 303 and RMID 305.

These MSRs are hardware components of a processor that are accessible to software and to a logical processor such as a thread, as illustrated by logical processor 109. Writing to these MSRs changes the active RMID of the logical processor from an old value to a new value and the same with CLOS. In this example, RMID 113 and CLOS 115 are shown as separate entities in the logical processor, but as noted above in FIG. 3, they may be fields in a single register. The logical processor 109 also includes a mechanism (such as one or more registers or cache memory) to store a state of the logical processor 109. Typically, there are more than one logical processors 109, 117 that are executed on one or more hardware cores such as core 119. Not shown is a credit accounting mechanism of the core which, in some embodiments, is per logical processor or RMID.

Figure 2:
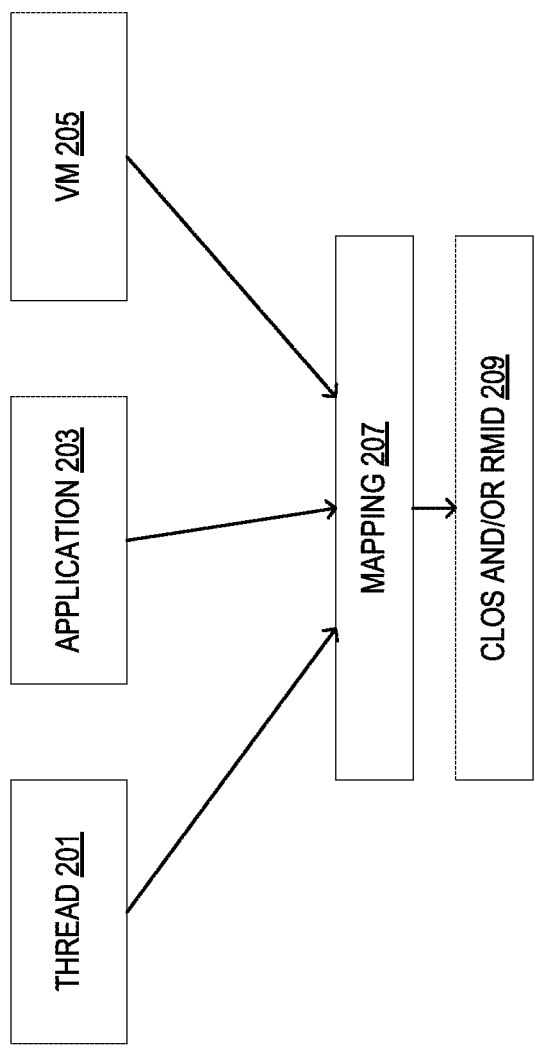
FIG. 2 illustrates an embodiment of a flexible mapping scheme to assign RMIDs or CLOS.

Threads may be monitored individually or in groups, and multiple threads may be given the same RMID or CLOS. FIG. 2 illustrates an embodiment of a flexible mapping scheme to assign RMIDs or CLOS. One or more threads 201, applications 203, and/or VMs 205 are subjected to a mapping 207 algorithm to product one or more RMIDs or CLOS.

As each application 203 or VM 205 consists of one or more threads, each application or VM is capable of being monitored. For example, all threads in a given VM could be assigned the same RMID or CLOS, as could all threads in an application. When a thread is swapped onto a core, the architectural register state of the logical processor is swapped into the hardware thread on the physical core.

Coupled to the core(s) is an interconnect 121. In some embodiments, this interconnect is a point-to-point link between cores and at least a last level cache (LLC) area 123. This area 123 includes cache memory 125 and in some embodiments includes sampling hardware 127, cache monitoring technology (CMT) hardware 129, and memory bandwidth monitoring hardware 131. These shared resource monitoring hardware tracks cache metrics such as cache utilization and misses as a result of memory accesses according to the RMIDs and typically report monitored data via one or more counter registers.

In some embodiments, software includes a pool for classes of service for the processor (available or not). Software executing on each core is subject to the limit for memory that the OS or VMM has programmed for it, allowing the OS/VMM to prioritize apps and to limit "noisy neighbor" applications which may be over-utilizing memory bandwidth. This has applicability across the datacenter, communications, NFV/SDN, etc.

Generically, resource bandwidth enforcement (RBE), such as memory bandwidth control, is provided by throttling at the source of requests, for instance a core. Rate throttling requests anywhere downstream (closer to memory) would cause queues in between to fill up, causing performance degradation and unfairness for the overall system (and not solving the problem). As detailed below, the embodiments herein throttle requestors (e.g., cores, accelerators, etc.) at the source, thus enabling more precise control over a particular requestor's bandwidth. By inserting a delay in the credit return path to the requestor, or limiting the requestor's total outstanding requests (by shrinking the credit pool) it is possible to modulate the bandwidth consumed by the requestor. In some embodiments, this delay is user programmable. It may be programmable in a table, register, etc.

In typical implementations a requestor (e.g., core) is provided a pool of credits with which to make requests. After a request completes, the requestor receives the credit back and can reuse it for subsequent requests. If the requestor makes too many requests and exhausts its credits then it must wait for outstanding requests to complete, and thus it stalls.

This is extensible across all cache levels and memory interface levels, though typically this would be used at the core-to-non-core boundary to limit the core bandwidth the non-core, allowing other cores running higher-priority workloads to run faster (via additional available bandwidth), or to control noisy neighbor applications, which can be identified via Memory Bandwidth Monitoring (MBM) 131.

Figure 4:
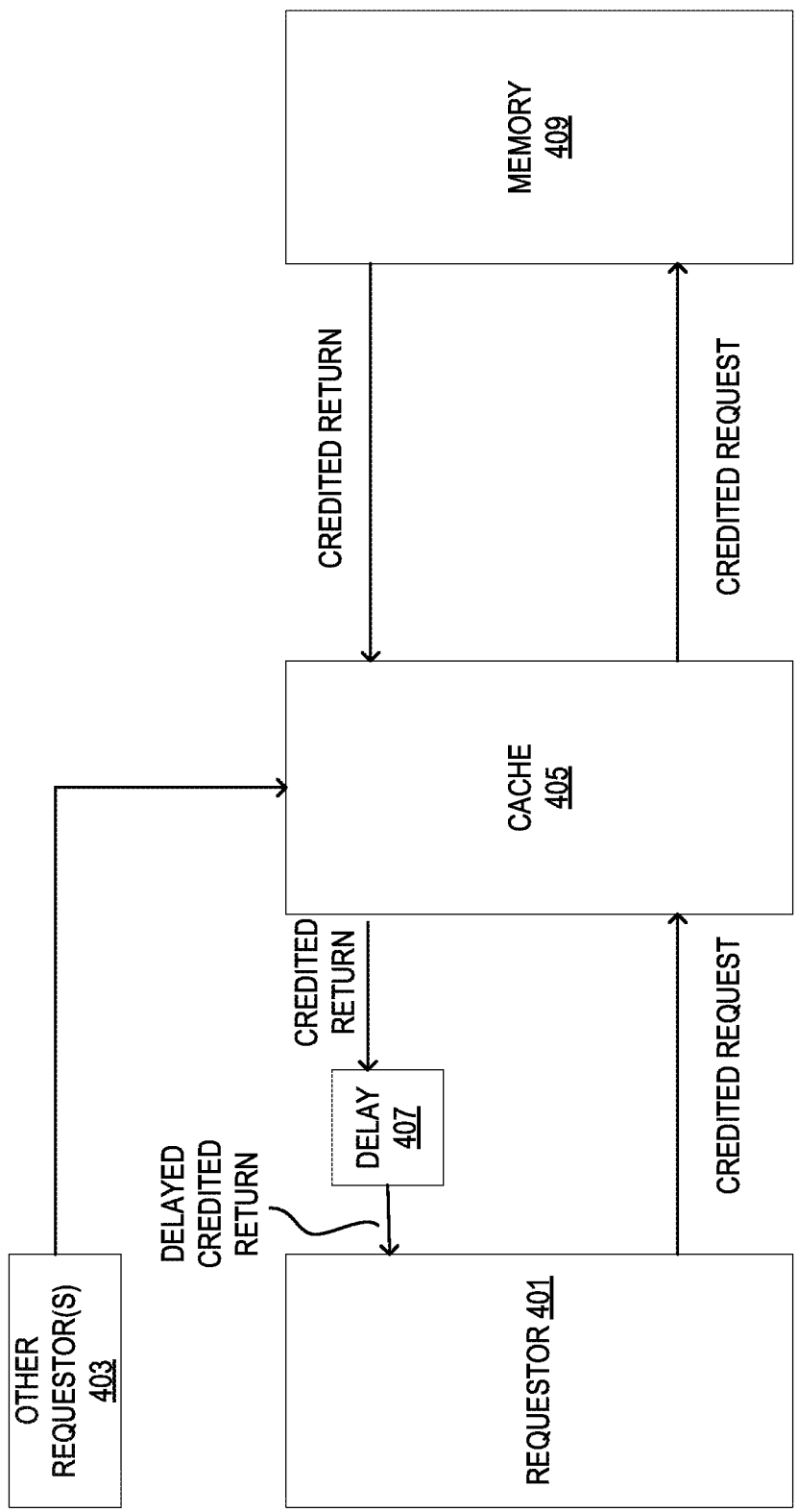
FIG. 4 illustrates an embodiment of a system using credit delay to enforce resource bandwidth.

FIG. 4 illustrates an embodiment of a system using credit delay to enforce resource bandwidth. A requestor 401 (such as a core) sends credited requests to cache (or another resource that uses credit based access control to a resource) 405. In most embodiments, the requestor 401 tracks its available credits.

In previous systems, once the cache 405 fulfilled the request it immediately returned the credit back to the requestor 401. However, as shown, a credit delay element 407 is introduced into the credit return path. In most embodiments, the amount of delay of is programmable as noted above.

Of course, there may be other requestors 403 that interact with the cache 405 that may or may not be subject to similar delay elements. The cache 405 transmits credited request to memory 409 and receives credit returns in response.

Due to the delay in the credit return path (or the limiting of the number of outstanding requests), the effective average core request rate to the cache 405 is reduced (as its credits are exhausted more quickly). The credit delays, or maximum outstanding credits programmed in the delay element, are fully software programmable in some embodiments, meaning that software may update the bandwidth available to a given thread at any time. Typically, this decision would be made by the OS or VMM which has sufficient visibility into the running apps/VMs and their relative priority levels to make such resource management decisions.

Figure 5:
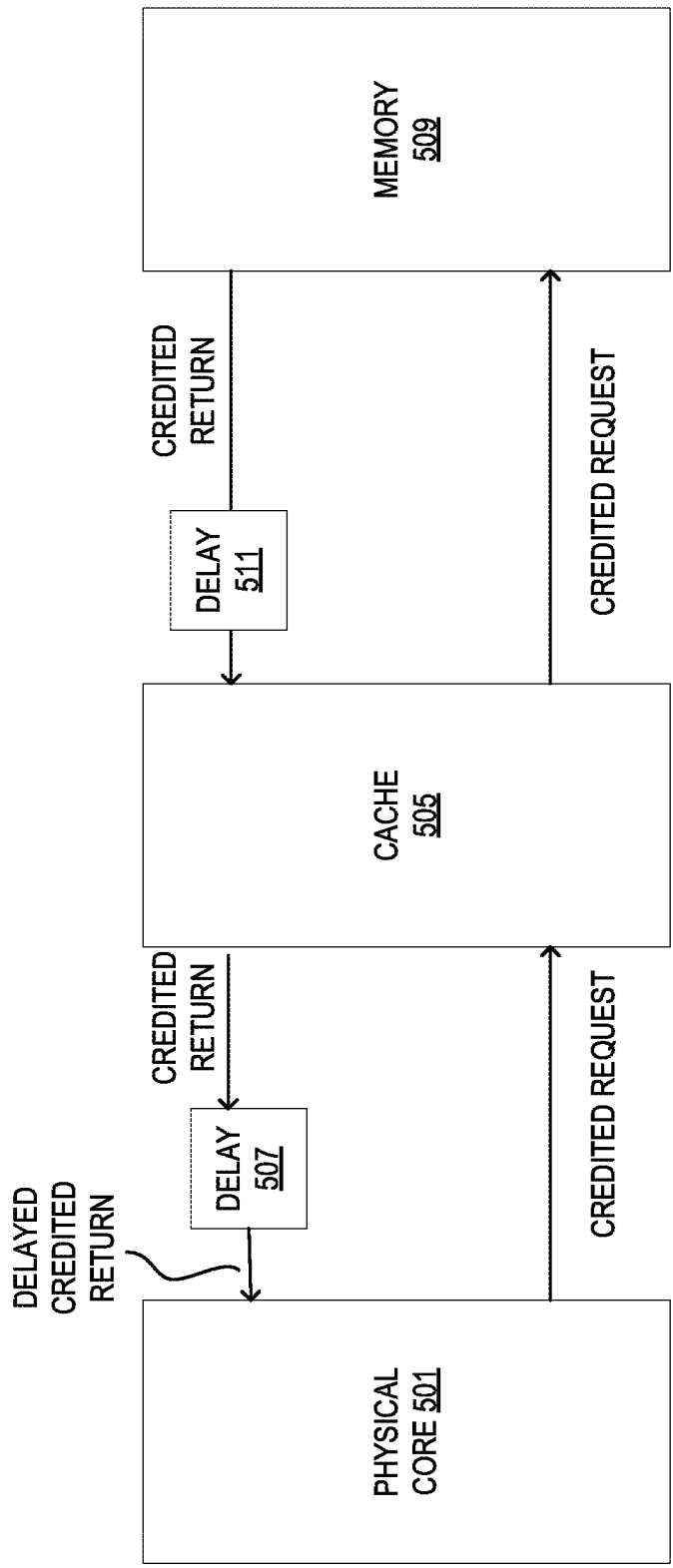
FIG. 5 illustrates an embodiment of a system that utilizes a delay element in multiple levels of a resource hierarchy.

FIG. 5 illustrates an embodiment of a system that utilizes a delay element in multiple levels of a resource hierarchy. Programmable credit return delay elements or elements which limit the maximum number of outstanding credits between any or all levels of the cache hierarchy or between caches and the memory controller are shown.

A requestor 501 (such as a core) sends credited requests to L2 cache (or another resource that uses credit based access to a resource) 505. In most embodiments, the requestor 501 tracks its available credits. For example, the requestor 501 may utilize a counter for allocable credits.

A credit delay element 507 is introduced into the credit return path. In most embodiments, the amount of delay of is programmable.

Of course, there may be other requestors 503 that interact with the cache 505 that may or may not be subject to similar delay elements.

Figure 6:
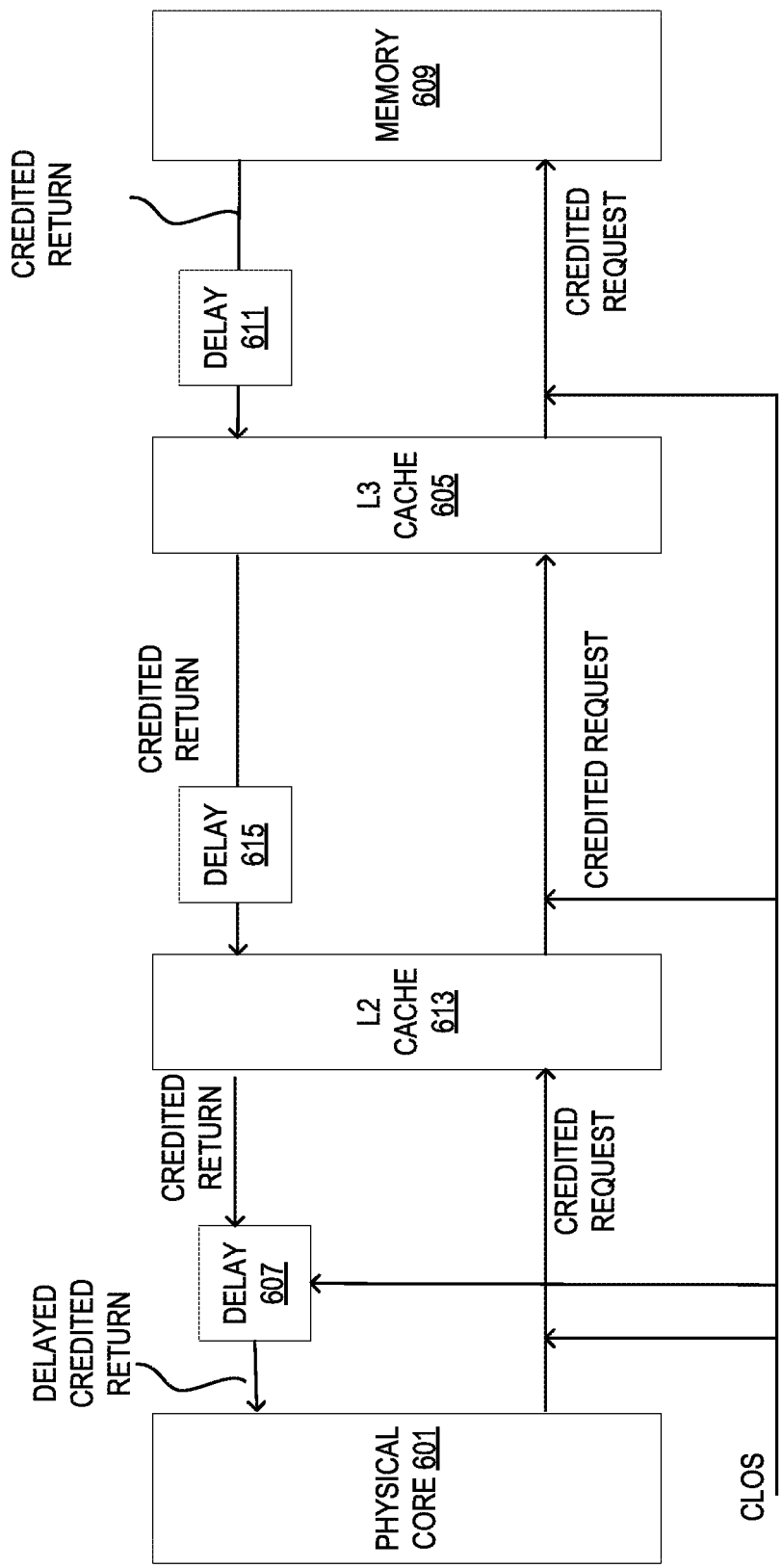
FIG. 6 illustrates an embodiment of a system using delay elements that utilizes CLOS.

The cache 505 transmits credited request to memory 509 and receives credit returns through credit delay element 511 in response. Depending upon the embodiment, each delay element is separately programmable FIG. 6 illustrates an embodiment of a system using delay elements that utilizes CLOS. A core 601 makes credit requests tagged with CLOS information to a receiver (here L2 cache 613) which consumed credits. When the supply of credits is exhausted the core's requests stall. In some embodiments, the CLOS information (CLOS tag 617) is also provided to the delay element 607.

The delay element 607, as previously described, limits the supply of credits available, or inserts a programmable delay in the credit return path to the core 601.

In some embodiments, the CLOS information 617 is propagated to request up the chain (e.g., from L2 cache 613 to L3 cache 605 to a memory control 609). Between each level in the memory hierarchy are delay elements 607, 615, 611 as detailed earlier.

Figure 7:
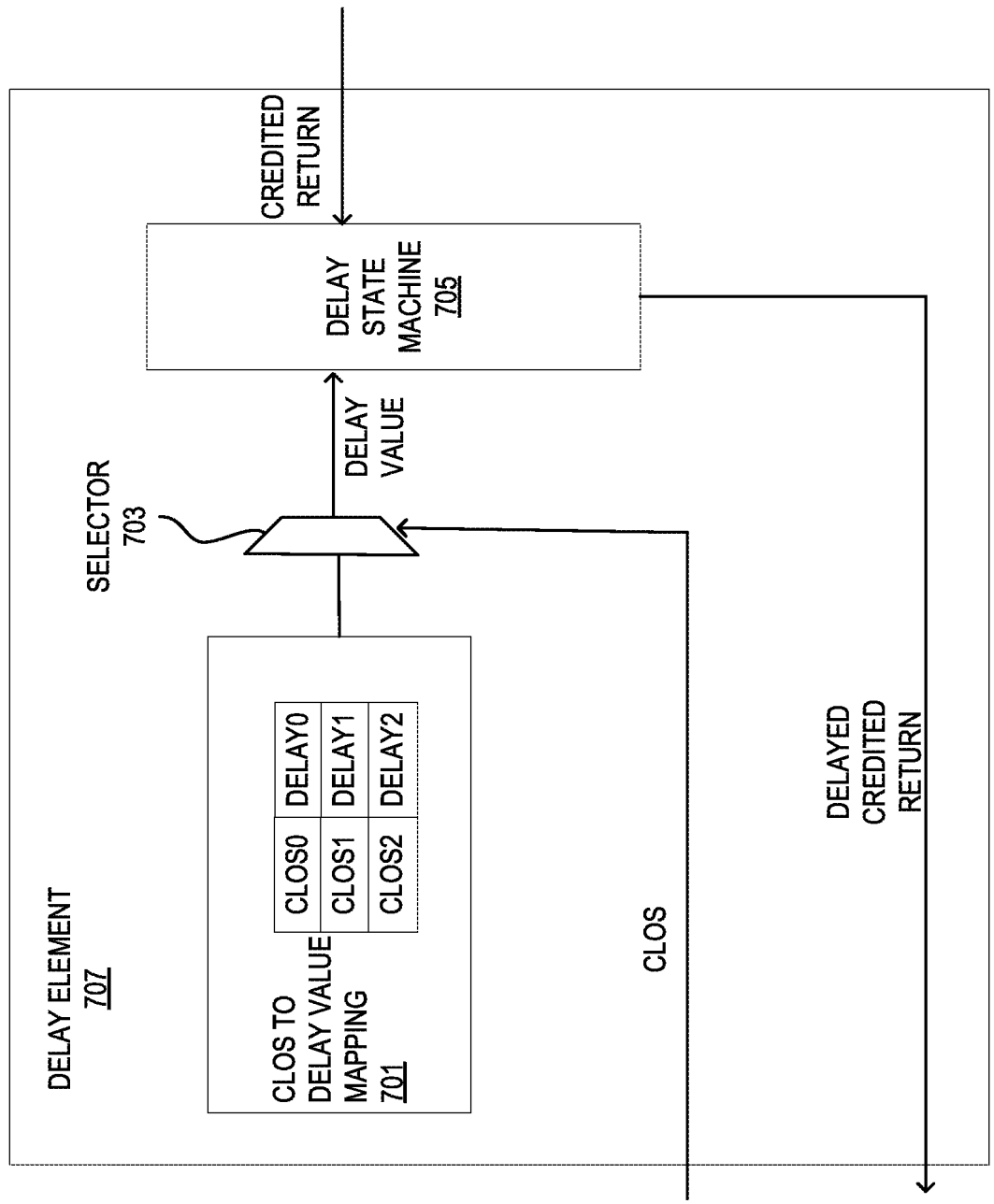
FIG. 7 illustrates an embodiment of a delay element.

FIG. 7 illustrates an embodiment of a delay element such as those detailed earlier. In some embodiments, the delay element 707 takes in CLOS information from a core (current thread) and a credit return. The output of the delay element 707 is a credit delayed by some amount.

The CLOS information is used by a selector 703 (e.g., a MUX) to select at delay value from CLOS to delay value map 701. As shown, this mapping 701 correlates different CLOS values with different delay values. In some embodiments, this map is a table. The delay value is then applied to the credit return path.

Depending upon the embodiment, a delay state machine 705 is utilized to apply one of several delay algorithms. A first algorithm, uses a simple coded delay such as the one used by the map 701. For example, for CLOS0, a delay of 2 ms is applied before a credit is returned. In a second algorithm, a total number of credits is tracked with respect to a total number of credits in use and allowed to be in use. In this algorithm, there is a limit on the maximum number of credits that can be in play at once such that a core will not receive return credits if it has consumed too many. In a third algorithm, CLOS is tied to bandwidth with a number of requests being tracked to determine an appropriate bandwidth for the CLOS. Typically, a running average for bandwidth is kept for determining limit on bandwidth for a particular requestor.

In some embodiments, the algorithm to use is user selectable. Of course, each of these delay algorithms may be hardcoded and thus not require a state machine.

Figure 8:
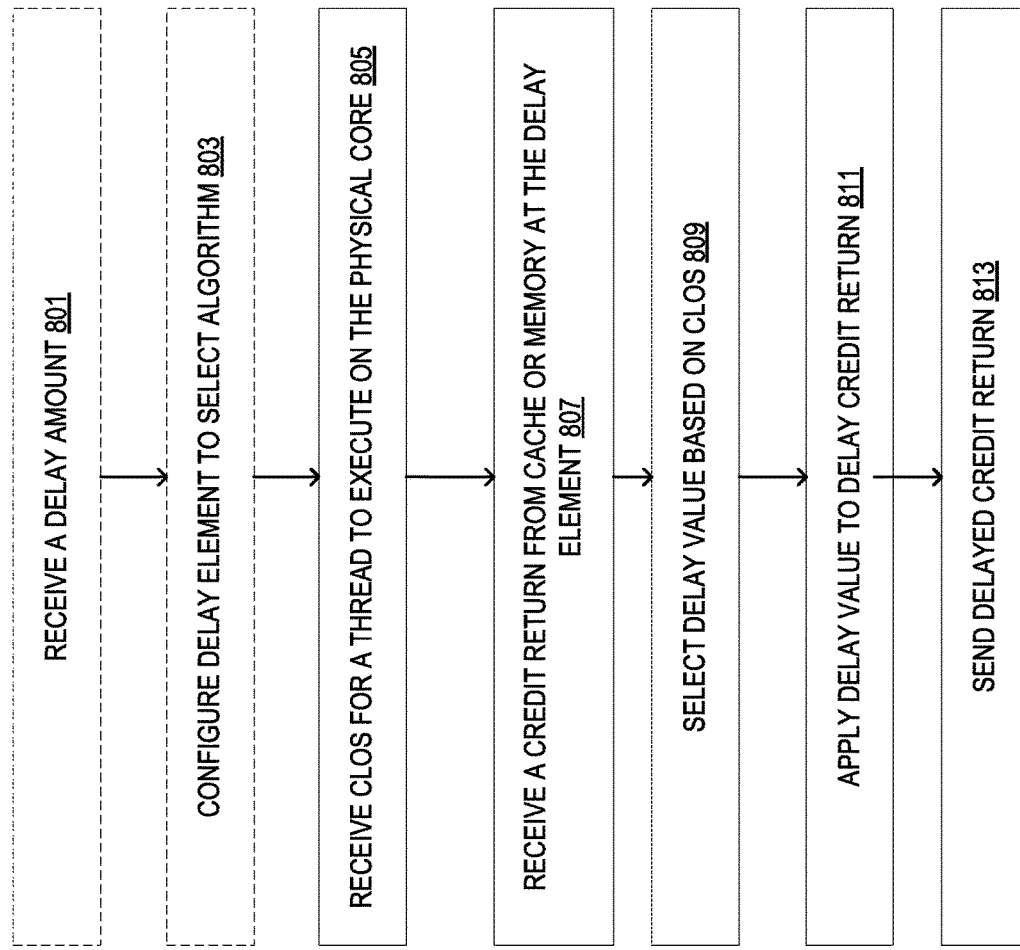
FIG. 8 illustrates an embodiment of a method utilizing a delay element or elements for resource bandwidth.

FIG. 8 illustrates an embodiment of a method utilizing a delay element or elements for resource bandwidth. At 801, in some embodiments, a delay amount for a delay element is received by that delay element. For example, the mapping detailed above is set for a plurality of CLOSs. This may be done for each delay element in the system.

In some embodiments, the delay element is configured to select one of the algorithms detailed above at 803.

At some point later in time, in some embodiments, a CLOS for a thread to execute on a physical core is received by the delay element at 805. For example, a MSR setting associated with the logical processor of the thread is received.

A credit return from cache or other memory element is received by the delay element at 807.

A delay value is selected by the delay element based on the received CLOS value at 809. This delay value is applied to the credit return path by delaying the return credit by the amount of the delay at 811. For example, the credit is buffered by the amount of the delay.

At 813, the delayed credit is sent to the requestor such as a physical core.

Figure 9:
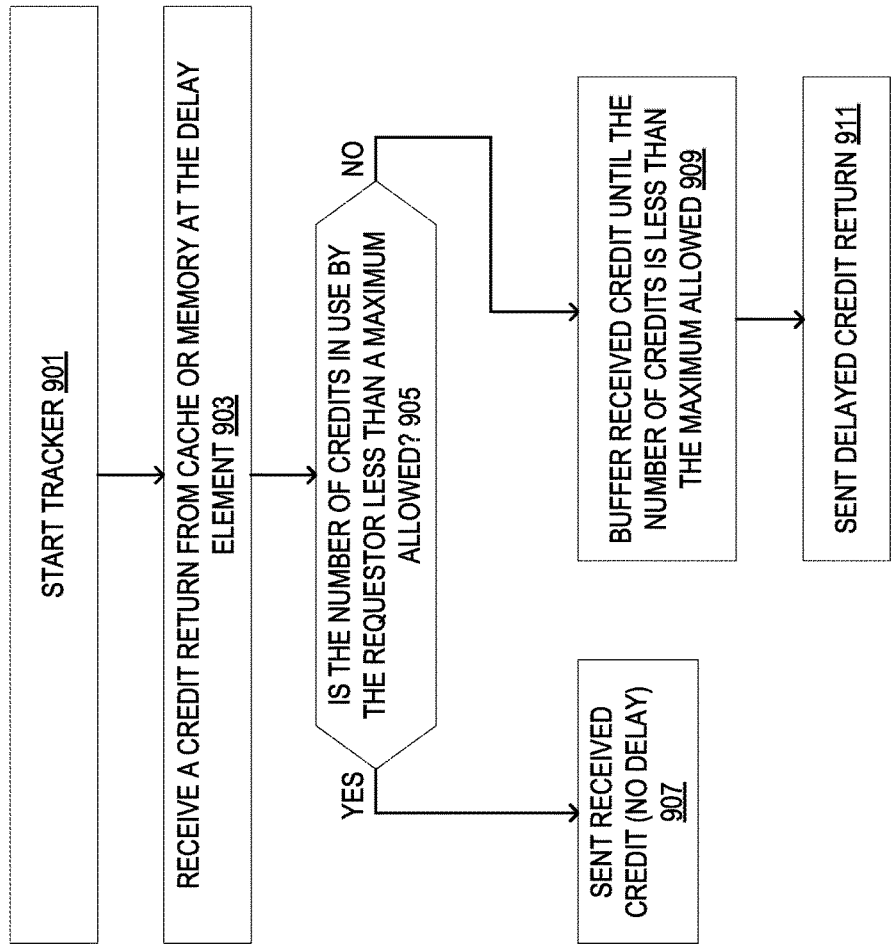
FIG. 9 illustrates an embodiment of a method utilizing a delay element or elements for resource bandwidth.

FIG. 9 illustrates an embodiment of a method utilizing a delay element or elements for resource bandwidth. At 901, a tracker for tracking for a number of credits is started. For example, a maximum number of credits allowed is set and the number of credits currently in use is counted using for example a counter. In some embodiments, this tracker is a part of either the sampling hardware 127 or the MBM 131.

A credit return from cache or other memory element is received by the delay element at 903. A comparison is made between a number of credits in use by the requestor and a maximum amount allowed at 905. When the number of credits is less than the maximum, received credit is sent to the requestor such as a physical core at 907.

When the number of credits in use is greater than the maximum, one or more credits are buffered until the number of credits in use is smaller than the maximum at 909. The delayed credits are transmitted when the credits in use meet the above condition at 911.

Detailed below are exemplary core architectures, processors, and architectures that may utilize the above described embodiments.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 10A is a block diagram illustrating both an exemplary in-order pipeline and an exemplary register renaming, out-of-order issue/execution pipeline according to embodiments of the invention. FIG. 10B is a block diagram illustrating both an exemplary embodiment of an in-order architecture core and an exemplary register renaming, out-of-order issue/execution architecture core to be included in a processor according to embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 11B:
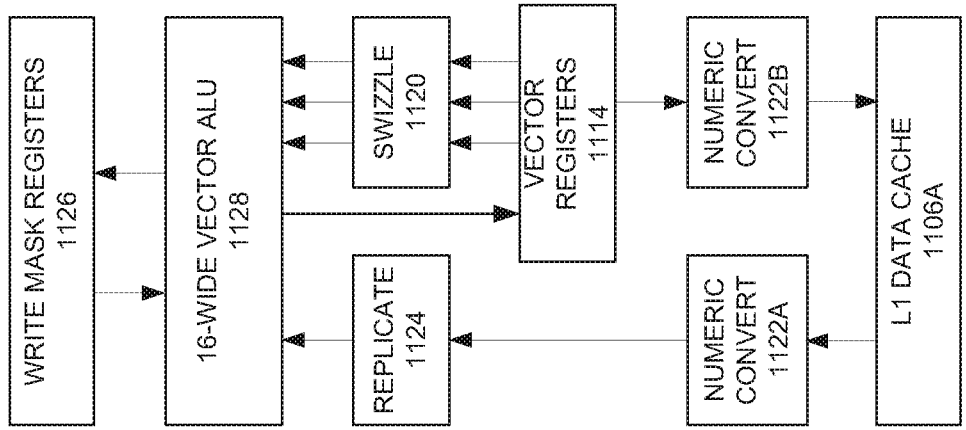
FIGS. 11A-B illustrate a block diagram of a more specific exemplary in-order core architecture, which core would be one of several logic blocks (including other cores of the same type and/or different types) in a chip.
Figure 11A:
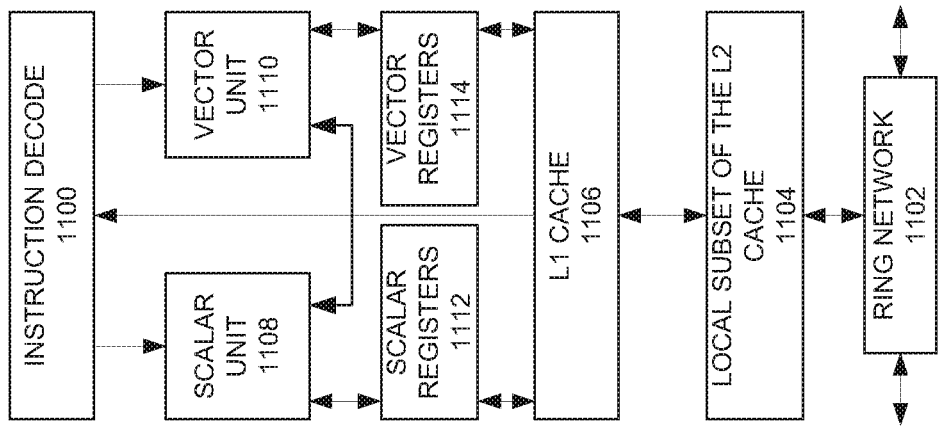

FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to embodiments of the invention. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, alternative embodiments of the invention may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to embodiments of the invention. FIG. 11B includes an L1 data cache 1106A part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Processor with Integrated Memory Controller and Graphics

Figure 12:
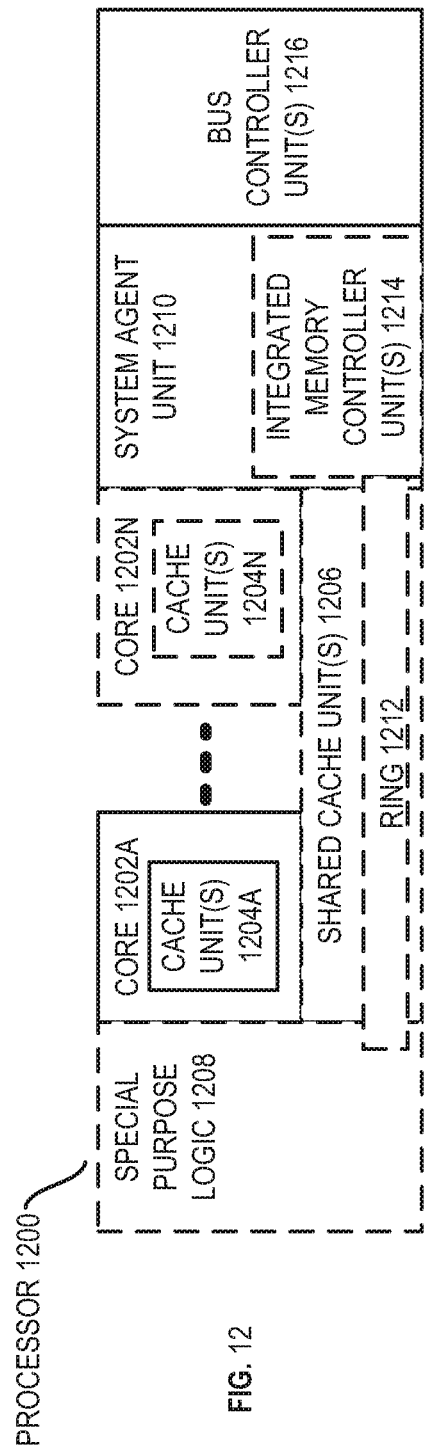
FIG. 12 is a block diagram of a processor 1200 that may have more than one core, may have an integrated memory controller, and may have integrated graphics according to embodiments of the invention.

FIG. 12 is a block diagram of a processor 1200 that may have more than one core, may have an integrated memory controller, and may have integrated graphics according to embodiments of the invention. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208, the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202-A-N.

In some embodiments, one or more of the cores 1202A-N are capable of multi-threading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Exemplary Computer Architectures

FIGS. 13-16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
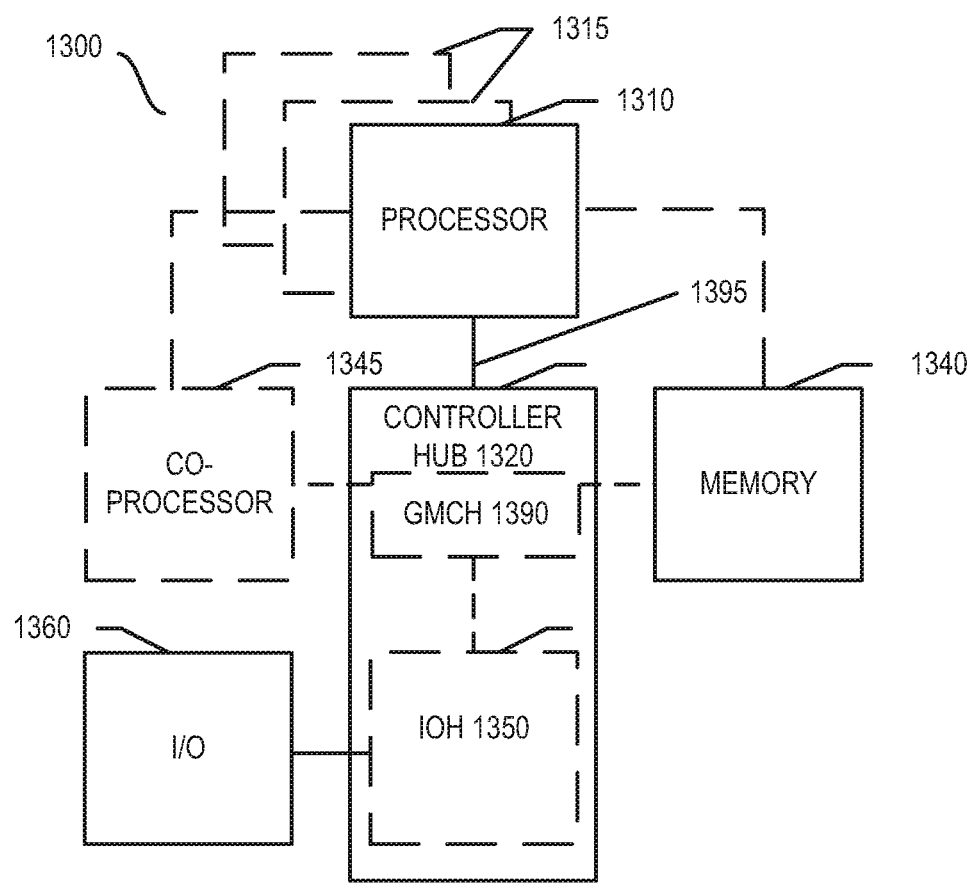
FIGS. 13-16 are block diagrams of exemplary computer architectures.

Referring now to FIG. 13, shown is a block diagram of a system 1300 in accordance with one embodiment of the present invention. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 is couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as QuickPath Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
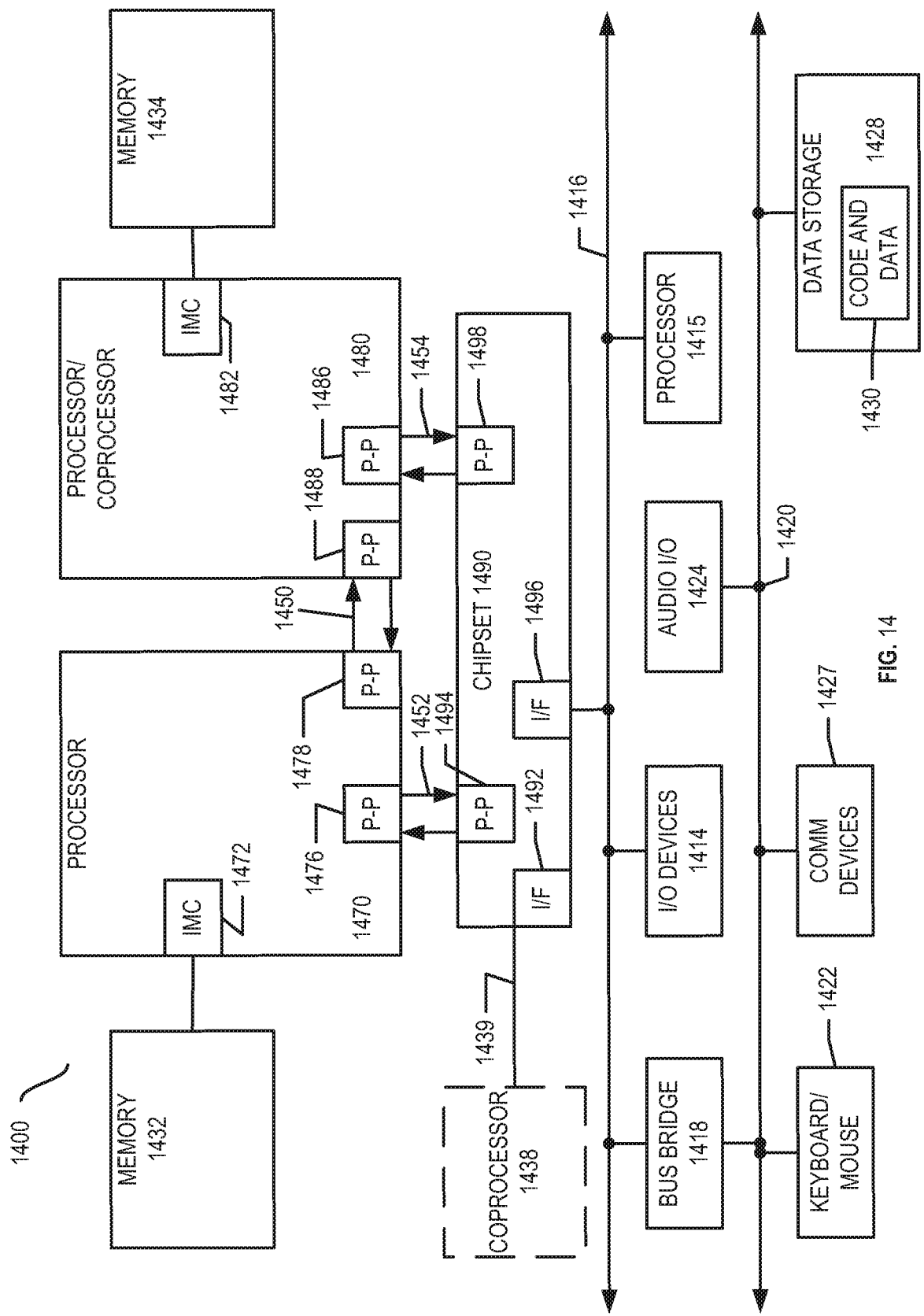

Referring now to FIG. 14, shown is a block diagram of a first more specific exemplary system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one embodiment of the invention, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1439. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
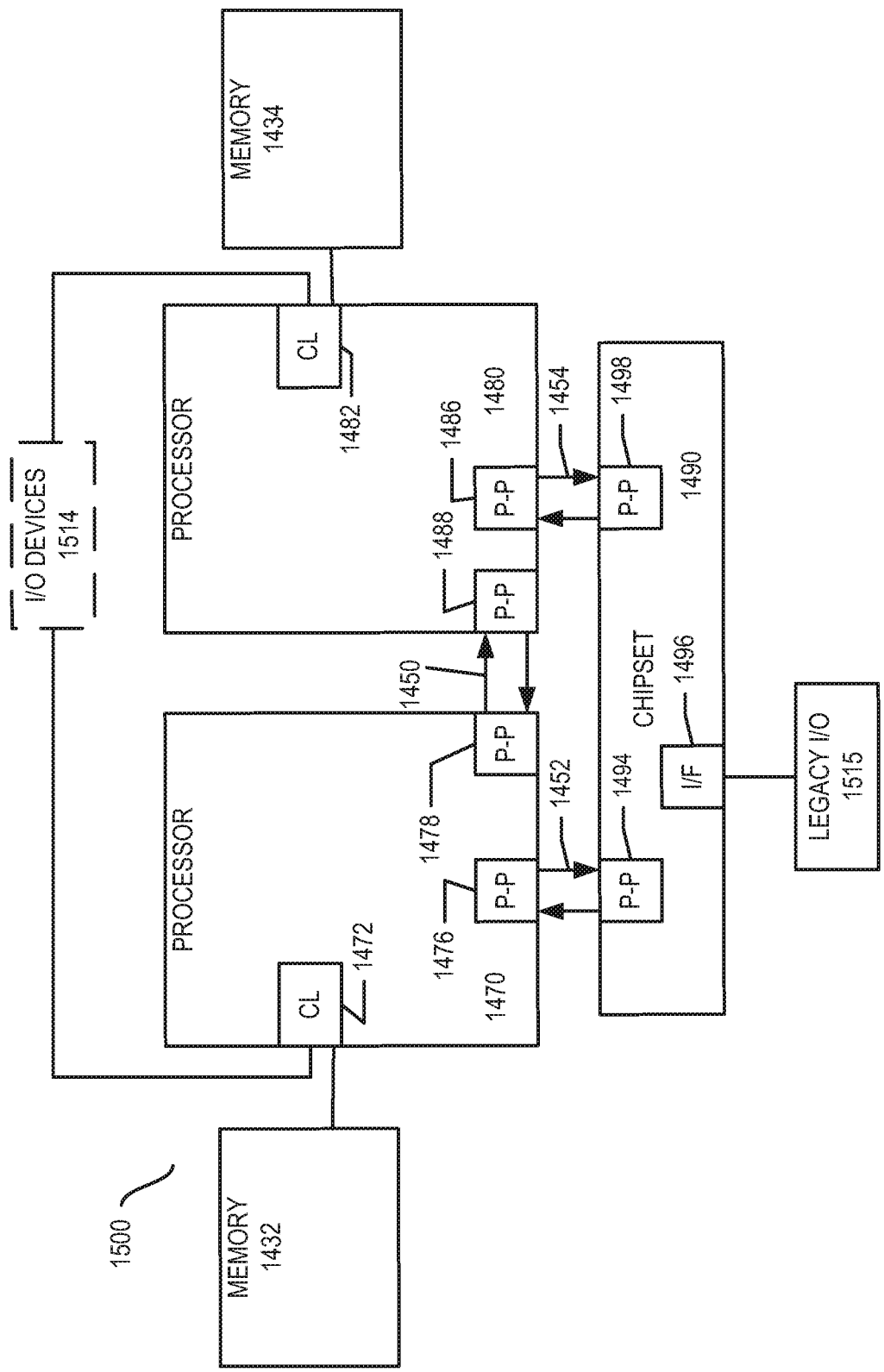

Referring now to FIG. 15, shown is a block diagram of a second more specific exemplary system 1500 in accordance with an embodiment of the present invention. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1472 and 1482, respectively. Thus, the CL 1472, 1482 include integrated memory controller units and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
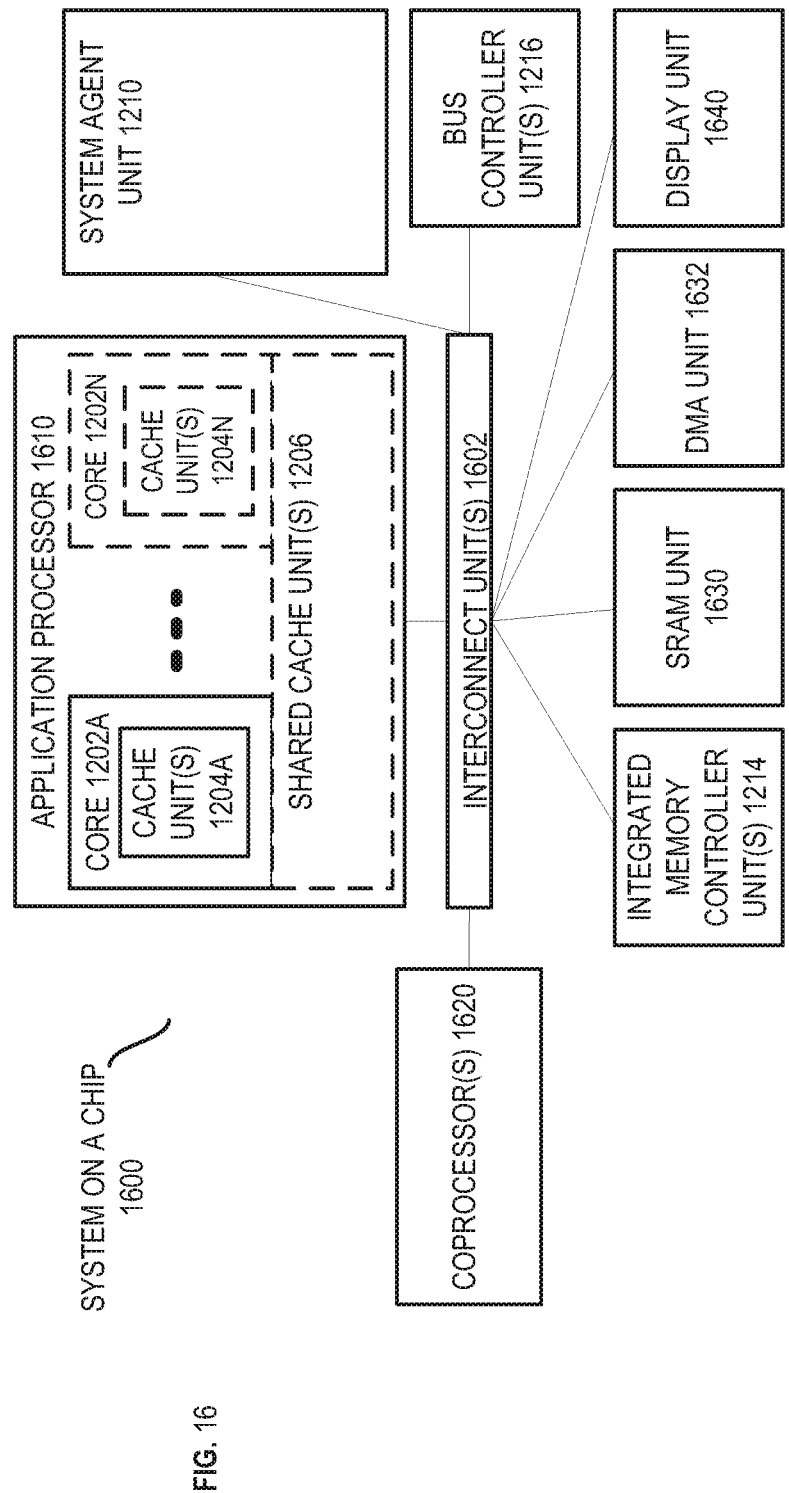

Referring now to FIG. 16, shown is a block diagram of a SoC 1600 in accordance with an embodiment of the present invention. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 202A-N and shared cache unit(s) 1206; a system agent unit 1210; a bus controller unit(s) 1216; an integrated memory controller unit(s) 1214; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 17 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, CA and/or that execute the ARM instruction set of ARM Holdings of Sunnyvale, CA).

The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

We claim:

1. A processor comprising:
a plurality cores, each core to provide one or more logical processors;
resource management circuitry to assign a class of service (CLOS) value and a resource management identifier (RMID) value to each logical processor of the plurality of logical processors, the resource management circuitry to track a plurality resource consumption metrics related to the plurality of logical processors using the RMID values, the resource management circuitry comprising:
a register associated with a first logical processor of the plurality of logical processors, the register associated with a first logical processor of the plurality of logical processors to store a first RMID value and a corresponding first CLOS value associated with the first logical processor;
circuitry to track cache utilization metrics associated with the first logical processor and to associate the cache utilization metrics with the RMID value, the cache utilization metrics to be reported in one or more counter registers;
circuitry to map the first CLOS value to a first bandwidth enforcement value associated with a first memory and a second bandwidth enforcement value associated with a second memory; and
memory bandwidth enforcement circuitry to limit memory requests by the first logical processor to the first memory in accordance with the first bandwidth enforcement value and to limit memory requests to the second memory in accordance with the second bandwidth enforcement value.

2. The processor of claim 1, wherein the first memory comprises a first type of memory and the second memory comprises a second type of memory different from the first type of memory.

3. The processor of claim 2, wherein the first memory comprises a cache memory and the second memory comprises a dynamic random access memory (DRAM).

4. The processor of claim 2, wherein the first type of memory is to be accessed with lower latency than the second type of memory.

5. The processor of claim 2, wherein the first memory and second memory are to be operable at different levels of a memory hierarchy.

6. The processor of claim 1, further comprising:
memory bandwidth monitoring circuitry comprising one or more counters to count memory requests by the first logical processor to the first memory and the second memory.

7. The processor of claim 6, wherein the memory bandwidth enforcement circuitry is to use count values from the one or more counters to determine when to limit the memory requests by the first logical processor to the first memory or the second memory.

8. The processor of claim 6, wherein the memory bandwidth monitoring circuitry is to maintain a running average of the bandwidth consumed by at least the first logical processor.

9. The processor of claim 1, wherein a number of RMID values are available, the processor comprising a storage to store an indication of the number of RMID values.

10. The processor of claim 1, wherein the first logical processor is to execute threads of a first application or first virtual machine (VM) associated with the RMID value and CLOS value.

11. The processor of claim 1, wherein limiting memory requests comprises delaying one or more of transactions associated with the first logical processor in accordance with the first bandwidth enforcement value or the second bandwidth enforcement value.

12. The processor of claim 1, wherein the register associated with the first logical processor of the plurality of logical processors is to store the first RMID value in a lower half of the register associated with the first logical processor of the plurality of logical processors and the corresponding first CLOS value associated with the first logical processor in an upper half of the register associated with the first logical processor of the plurality of logical processors.

13. The processor of claim 1, wherein the register associated with a first logical processor of the plurality of logical processors is a model specific register (MSR).

* * * * *